(12) United States Patent
Muschett et al.

(10) Patent No.: US 11,664,010 B2
(45) Date of Patent: May 30, 2023

(54) NATURAL LANGUAGE DOMAIN CORPUS DATA SET CREATION BASED ON ENHANCED ROOT UTTERANCES

(71) Applicant: Florida Power and Light Company, Juno Beach, FL (US)

(72) Inventors: Brien H. Muschett, Palm Beach Gardens, FL (US); Joshua D. Calhoun, Stuart, FL (US)

(73) Assignee: Florida Power & Light Company, Juno Beach, FL (US)

( * ) Notice: Subject to any disclaimer, the term of this patent is extended or adjusted under 35 U.S.C. 154(b) by 197 days.

(21) Appl. No.: 17/088,071

(22) Filed: Nov. 3, 2020

(65) Prior Publication Data

US 2022/0139372 A1    May 5, 2022

(51) Int. Cl.
*G10L 15/06* (2013.01)
*G06F 40/58* (2020.01)

(52) U.S. Cl.
CPC ............ *G10L 15/063* (2013.01); *G06F 40/58* (2020.01)

(58) Field of Classification Search
CPC .......... G06F 40/40; G06F 40/50; G06F 40/30; G10L 15/18; G10L 15/063; G10L 15/16
See application file for complete search history.

(56) References Cited

U.S. PATENT DOCUMENTS 5,715,468 A    2/1998  Budzinski
6,006,221 A   12/1999  Liddy et al.
6,341,372 B1   1/2002  Datig
6,658,388 B1  12/2003  Kleindienst et al.
7,295,964 B2  11/2007  Suzuki
(Continued)

FOREIGN PATENT DOCUMENTS

JP    2019121241 A  *  7/2019  ......... G06F 17/2854

OTHER PUBLICATIONS

Judith Gaspers, Penny Karanasou, Rajen Chatterjee "Selecting Machine-Translated Data for Quick Bootstrapping of a Natural Language Understanding System" arXiv:1805.09119v1 (Year: 2018).*

(Continued)

*Primary Examiner* — Richemond Dorvil
*Assistant Examiner* — Alexander G Marlow
(74) *Attorney, Agent, or Firm* — Fleit Intellectual Property Law; Jeffrey N. Guinta

(57) ABSTRACT

Systems and methods for generating a natural language domain corpus to train a machine learning natural language understanding process. A base utterance expressing an intent and an intent profile indicating at least one of categories, keywords, concepts, sentiment, entities, or emotion of the intent are received. Machine translation translates the base utterance into a plurality of foreign language utterances and back into respective utterances in the target natural language to create a normalized utterance set. Analysis of each utterance in the normalized utterance set determines respective meta information for each such utterance. Comparison of the meta information to the intent profile determines a highest ranking matching utterance within the normalized utterance set. A set of natural language data to train a machine learning natural language understating process is created based on further natural language translations of the highest ranking matching utterance.

14 Claims, 5 Drawing Sheets

(56) References Cited

U.S. PATENT DOCUMENTS

| | | | |
|---|---|---|---|
| 7,467,081 | B2 | 12/2008 | Alshawi et al. |
| 7,523,085 | B2 | 4/2009 | Nigam et al. |
| 7,600,017 | B2 | 10/2009 | Holtzman et al. |
| 8,073,683 | B2 | 12/2011 | Alshawi et al. |
| 8,204,739 | B2 | 6/2012 | Waibel et al. |
| 8,239,207 | B2 | 8/2012 | Seligman et al. |
| 8,346,536 | B2 | 1/2013 | Jiang et al. |
| 8,666,928 | B2 | 3/2014 | Tunstall-pedoe |
| 8,990,068 | B2 | 3/2015 | Orsini et al. |
| 9,195,646 | B2 | 11/2015 | Tsuchida et al. |
| 9,495,425 | B1 | 11/2016 | Kuznetsov |
| 9,613,027 | B2 | 4/2017 | Hwang et al. |
| 9,652,452 | B2 | 5/2017 | Iverson |
| 9,697,192 | B1 | 7/2017 | Estes et al. |
| 9,740,688 | B2 | 8/2017 | Huang et al. |
| 9,898,460 | B2 | 2/2018 | Akbik et al. |
| 9,971,763 | B2 | 5/2018 | Abdel-reheem |
| 9,984,585 | B2 | 5/2018 | Aggarwal et al. |
| 10,460,036 | B2 | 10/2019 | Duong et al. |
| 10,699,060 | B2 | 6/2020 | Mccann et al. |
| 2001/0029455 | A1 | 10/2001 | Chin et al. |
| 2010/0299132 | A1 | 11/2010 | Dolan et al. |
| 2014/0164097 | A1 | 6/2014 | Stoikovitch |
| 2017/0109651 | A1 | 4/2017 | Bruno |
| 2018/0165279 | A1 | 6/2018 | Issaev |
| 2018/0357224 | A1* | 12/2018 | Yamauchi ............... G06F 40/51 |
| 2019/0138923 | A1 | 5/2019 | Jacobs |
| 2019/0158439 | A1 | 5/2019 | Tetreault et al. |
| 2019/0164062 | A1 | 5/2019 | Moura et al. |
| 2019/0332931 | A1 | 10/2019 | Montantes |
| 2020/0125928 | A1 | 4/2020 | Doyle |
| 2020/0184158 | A1* | 6/2020 | Kuczmarski ........... G06N 20/00 |
| 2021/0133251 | A1* | 5/2021 | Tiwari ................. G06F 40/205 |
| 2021/0184995 | A1* | 6/2021 | Jones ...................... G06F 40/58 |
| 2021/0365645 | A1* | 11/2021 | Li .......................... G06F 40/58 |

OTHER PUBLICATIONS

Jonathan Mallinson, Rico Sennrich, and Mirella Lapata. 2017. Paraphrasing Revisited with Neural Machine Translation. In Proceedings of the 15th Conference of the European Chapter of the Association for Computational Linguistics: vol. 1, Long Papers, pp. 881-893, Valencia, Spain. (Year: 2017).*

Wilker Aziz and Lucia Specia. 2013. Multilingual WSD-like Constraints for Paraphrase Extraction. In Proceedings of the Seventeenth Conference on Computational Natural Language Learning, pp. 202-211, Sofia, Bulgaria. Association for Computational Linguistics. (Year: 2013).*

Fabricio Monsalve, Kervy Rivas Rojas, Marco Antonio Sobrevilla Cabezudo, and Arturo Oncevay. 2019. Assessing Back-Translation as a Corpus Generation Strategy for non-English Tasks: A Study in Reading Comprehension and Word Sense Disambiguation. In Proceedings of the 13th Linguistic Annotation Workshop (Year: 2019).*

T. Misu, E. Mizukami, H. Kashioka, S. Nakamura and H. Li, "A bootstrapping approach for SLU portability to a new language by inducting unannotated user queries," 2012 IEEE International Conference on Acoustics, 2012, pp. 4961-4964, doi: 10.1109/ICASSP.2012.6289033. (Year: 2012).*

Shiqi Zhao, Haifeng Wang, Xiang Lan, and Ting Liu. 2010. Leveraging Multiple MT Engines for Paraphrase Generation. In Proceedings of the 23rd International Conference on Computational Linguistics (Coling 2010), pp. 1326-1334, Beijing, China. Coling 2010 Organizing Committee (Year: 2010).*

Automatic expansion of DBpedia exploiting Wikipedia cross-language information, by Aprosio, Extended Semantic Web Conference. Springer, Bedin, Heidelberg, 2013.

Semi-supervised semantic role labeling using the latent words language model by Deschacht; Proceedings of the 200S Conference on Empirical Methods in Natural Language Processing: vol. 1-vol. 1. Association for Computational Linguistics, 2009.

Multilingual subjectivity: Are more languages better? Proceedings of the 23rd international conference on computational linguistics. Association for Computational Linguistics, 2010.

Hajic: The CoNLL-2009 shared task: Syntactic and semantic dependencies in multiple languages.

Pustejovsky: Natural Language Annotation for Machine Learning: A guide to corpus-building for applications, 2012.

Wang: SentiGAN: Generating Sentimental Texts via Mixture Adversarial Networks, 2018.

Huber: Emotional dialogue generation using image-grounded language models; Proceedings of the 2018 CHI Conference on Human Factors in Computing Systems. 2018.

Fleischman: Towards emotional variation in speech-based natural language processing; Proceedings of the International Natural Language Generation Conference. 2002.

* cited by examiner

NATURAL LANGUAGE DOMAIN CORPUS DATA SET CREATION BASED ON ENHANCED ROOT UTTERANCES

FIELD OF THE DISCLOSURE

The present disclosure generally relates to systems to train machine learning based models, and more particularly to automatically creating natural language data sets that are able to be used to train and test machine learning based models.

BACKGROUND

Natural language processing is able to include natural language classification (NLC) systems that perform intent identification such as is used to support automated natural language conversational systems (e.g., chat bots). Natural Language Classification systems are able to incorporate supervised machine learning models to represent the domain for which classification is to be provided. The ability of such supervised machine learning models to properly classify a wide range of natural language phrases is dependent upon the extent and quality of variations that exists in the training data sets used to train those machine learning models. Development of an extensive training data set for use in training supervised machine learning models is generally a labor-intensive process that relies on skilled language experts.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
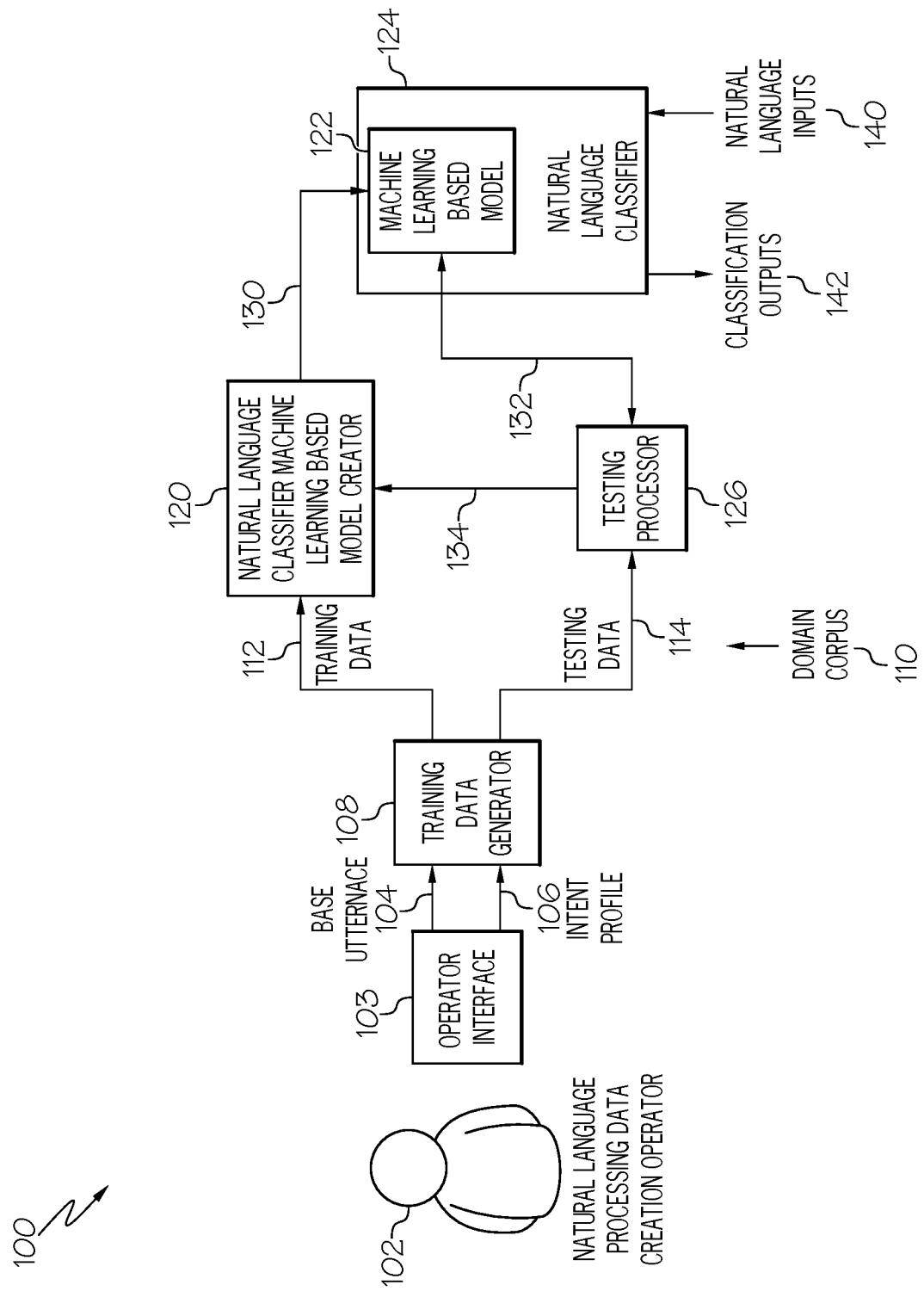
FIG. 1 illustrates an example natural language classification training system, according to an example.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

Natural Language Classification (NLC) systems that include, for example, intent identification are used to support natural language conversational systems such as chat bots. Natural Language Classification systems are able to incorporate supervised machine learning based models to represent the domain for which classification is to be provided. Conventional machine learning based models are often created through training and testing using humanly curated training and testing data sets representing utterances the target domain. The training data, often referred to as ground truth, are able to be selected in conventional systems by subject matter experts (SMEs) as part of developing a supervised machine learning methodology to train a machine learning based natural language classification system. Testing data, which is used to validate a machine learning based model after it has been trained by one or more training data sets, is also collected in a similar fashion and segregated from the training data. The composite set of training data and testing data is referred to as the domain corpus.

Creating supervised machine learning based models that are able to properly classify a wide range of natural language phrases is dependent upon having a suitably extensive and diverse training data set that is used to train the machine learning based models. An insufficiently extensive or diverse training data set will cause the machine learning based models trained with that data to be unable to properly process and classify the desired range of natural language inputs. In some examples, it may not be determined that a model is not able to process the desired range of natural language inputs until after the system using that model is deployed and has operated for a while, thus resulting in periods of sub optimal performance of the operational system and additional costs to handle errors that may be caused by the model's failings.

In conventional systems, multiple subject matter experts are sometimes employed in order to provide a more extensive domain corpus to enhance the quality of a machine learning based model. In many cases, this is done with a team whose native language is the target language model for the domain corpus. The subject matter expert team in an example works together to develop and agree on the data sets used in training and testing the machine learning based model.

A challenge that may be present when creating a suitable training data set in the development of conventional systems is employing subject matter experts whose native language is the target language. A suitably expansive training data set used for training natural language classification models often includes utterances produced by a language-diverse population for which the target language is not the person's primary language. For example, an English utterance "I need help in finding a primary care physician for my adolescent child" may have a representative utterance written by a native Finnish speaker of "I'm gonna need some help finding the chief medical doctor for my kid." In order to obtain a representative corpus of training/test data that is able to address processing utterances from such language-diverse populations, multiple subject matter experts, who are expert with both native and non-native speakers, are included in the supervised learning methodology. This is both time consuming and expensive, thus often making this desired functionality for a natural language classification system difficult to achieve.

The below described systems and methods operate to automatically generate or augment an expansive domain corpus that includes a diverse set of natural language utterances in a target language. In an example, a generated or augmented domain corpus includes training data sets and testing data sets that each include natural language utterances that are used to train and validate machine learning based models used for natural language classification. The below described systems and methods in some examples operate to produce a sufficiently expansive domain corpus to allow training of machine learning based models to perform natural language classification for identifying intent in utterances spoken by non-native speakers.

The below described systems and methods simplify and automate the creation of a domain corpus in a manner that greatly reduces the labor and, in some cases, the required skill level of persons creating the domain corpus. The below described systems and methods accept a base utterance and an intent profile specification for that base utterance from an operator. The base utterance is then processed to automatically create a normalized utterance set, which includes a number of diverse utterances that have meanings similar to the base utterance. The utterances in the normalized utterance set are then processed by a cognitive enrichment service in order to extract, for example, various intent parameters for each utterance. These intent parameters for each utterance in the normalized set of utterances are compared to the intent profile specification provided by the operator. Each utterance in the normalized utterance set is ranked according to the comparison of its intent parameters with the intent profile specification. In an example, the highest ranked utterance matching the intent profile specification is selected as a root/model utterance. Further processing of the root/model utterance is performed to create an expansive and diverse domain corpus that is able to be used to train a machine learning model to perform natural language classification.

The below described systems and methods address situations where a base/initial utterance is selected that has low semantic fidelity, as might occur by a suboptimal selection by a subject matter expert or other operator. The below described systems and methods operate to automatically optimize the base utterance provided by an operator by generating a normalized utterance set that contains a large number of candidate utterances, annotating each candidate utterance with meta information obtained by processing of a cognitive enrichment service, and matching that meta information against a target intent profile provided by the subject matter expert or other operator to improve the semantic fidelity/richness of a generated root/model utterance. The generated root/model utterance in an example is automatically generated and selected by processing described below, and is the basis for further automatically creating an expansive domain corpus. By performing processing to create a root/model utterance by optimizing an operator provided base utterance, the below described systems and methods allow reductions in the machine learning model creation time, operator labor time and, in some cases, operator skill levels, and produces a model that more fully covers the desired domain. Conventional curation of a domain corpus used to train machine learning models for natural language classification often includes labor intensive, manual creation of the entire domain corpus using subject matter experts and subsequent, iterative domain corpus curation by analyzing operational logs produced by a computer trained model after it has been trained and placed into operation to identify mis-classifications or other error that are to be addressed by expanding the domain corpus. Such conventional techniques often use multiple subject matter experts across a language set and can be both time consuming and expensive.

FIG. 1 illustrates an example natural language classification training system 100, according to an example. The example natural language classification training system 100 is an example of a system that implements processing to allow efficient generation of a domain corpus that includes a training data set and a testing data set to support training of machine learning based models to perform natural language classification. In an example, the example natural language classification training system 100 performs supervised machine learning processing to train machine learning based models to perform natural language classification based on a set of training data that is created by the below described processing. In an example, one or more base utterances, such as phrases or sentences, are selected that convey intents that the natural language classification system is to understand. In order to further facilitate supervised machine learning of the natural language classification system, an intent profile is provided along with each base utterance. The intent profile, in an example, specifies metadata or meta information for each base utterance that specifies intent parameters that indicate aspects of intent such as at least one of categories, keywords, concepts, sentiment, entities, or emotion that are conveyed by its associated base utterance. In some examples, an operator is able to specify levels of confidence that a candidate utterance is to satisfy in order to be considered as a root/model utterance. In general, an intent profile is able to be a template for which a matching algorithm can be specified where that matching algorithm is to be applied to determine a highest ranking matching utterance that is to be used as a root/model utterance. In general, the intent parameters specified in an intent profile are able to be drawn from any arbitrary set of characteristics that are identified by a cognitive enrichment service as is described in further detail below.

The training data set and testing data set form a domain corpus that contains a large number of natural language utterances in a target language that is used to perform supervised learning of the natural language classification models.

The example natural language classification training system 100 depicts a natural language processing data creation operator 102. The natural language processing data creation operator 102 in an example uses an operator interface 103 to provide at least one base utterance 104 and an associated intent profile 106 that specifies parameters for the intent that the base utterance is intended to covey. In various examples, the operator interface 103 is able to provide any type of interface facilities to allow the natural language processing data creation operator 102 to provide utterances and intent profiles. In some examples, the operator interface 103 includes one or more of text entry facilities, audio entry facilities, any other type of interface facilities, or combinations of these.

In order to simplify the description of the example systems and methods, the following discussion describes the processing of a single base utterance 104 and an associated intent profile 106 for that base utterance 104. It is to be understood that the below described examples are able to receive and process any number of base utterances and their associated intent profiles from any number of natural language processing data creation operators.

In an example, a natural language processing data creation operator 102 determines base utterances 104, such as phrases or sentences, and also specifies further information about the intent those utterances are to convey in the form of an associated intent profile 106. In some examples the natural language processing data creation operator 102 is able to be a skilled subject matter expert in developing a domain corpus for training a machine learning based natural language understanding processes. In some examples, the automated nature of the below described systems and methods allows natural language processing data creation operator 102 with less skill or knowledge to effectively direct the automatic creation of a domain corpus that is able to be used to effectively train a machine learning based natural language understanding processes.

A training data generator 108 receives the base utterance 104 and its associated intent profile 106. As described in further detail below, the training data generator 108 processes the base utterance 104 and its associated intent profile 106 to create a domain corpus 110 that includes a training data set 112 and a testing data set 114. The domain corpus 110 includes a number of utterances that are related to the base utterance 104 and that convey the intent specified by the intent profile 106.

A natural language classifier machine learning based model creator 120 receives the training data set 112 and to determine model parameters 130 for a machine learning based model 122 to perform natural language classification. In an example, the natural language classifier machine learning based model creator 120 performs supervised machine learning processing to train a machine learning based model 122 based on the received training data set 112.

A testing processor 126 receives the testing data set 114 and uses that data to test the performance of the machine learning based model 122. In an example, testing of the machine learning based model 122 involves exchanging test utterances and classifications 132 and determining classification errors 134 in the classifications determined by the model. Any determined classification errors 134 are provided to the natural language classifier machine learning based model creator 120 in order to further develop the machine learning based model 122.

A natural language classifier 124 includes the machine learning based model 122 and is used to process natural language inputs 140 and produce classification outputs 142. In an example, the natural language classifier is used to perform automated processing of natural language inputs, such as would be received from customers or any other set of persons, in order to provide a more machine usable classification of the inputs to support further automated processing.

Figure 2:
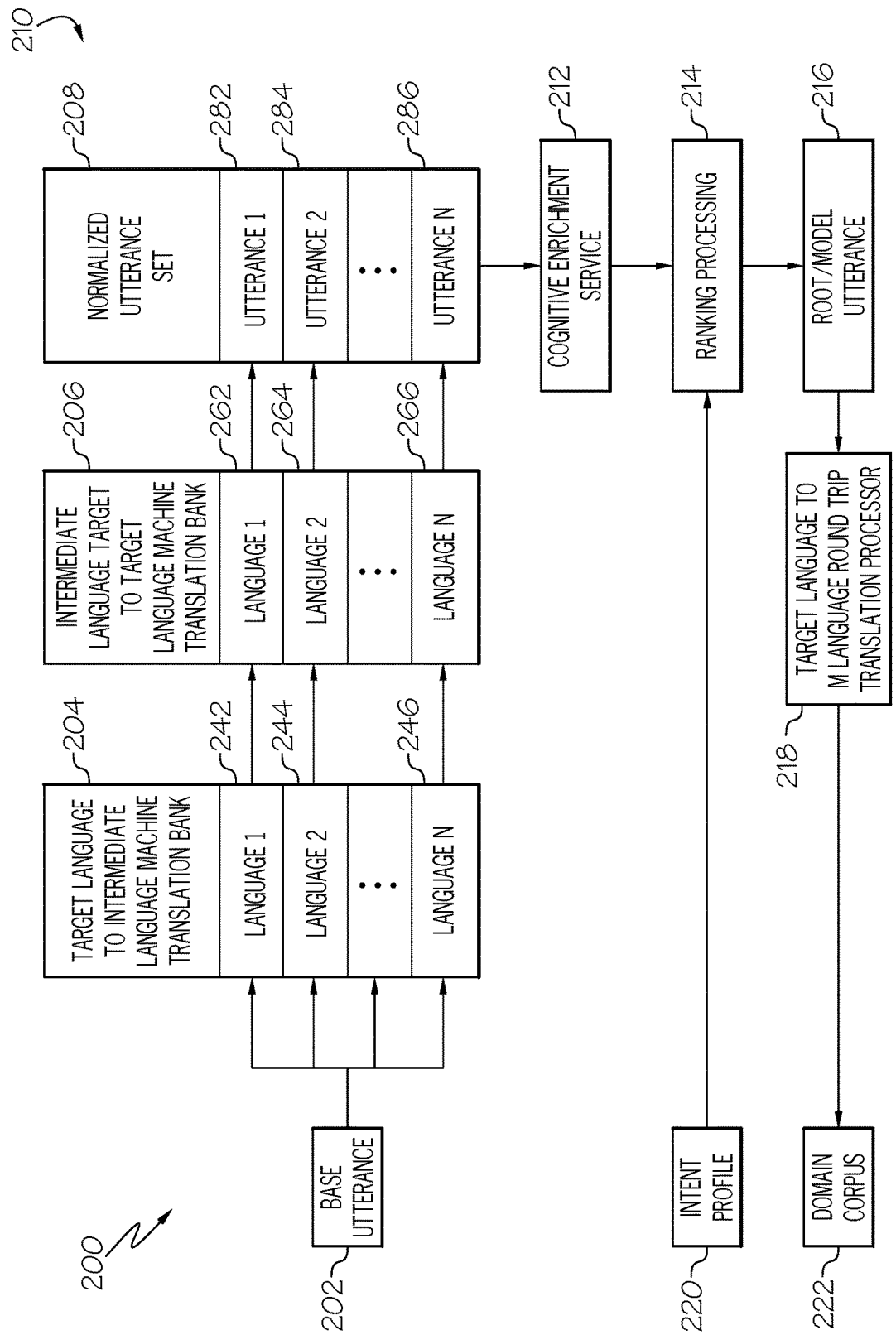
FIG. 2 illustrates an example domain corpus generation process, according to an example.

FIG. 2 illustrates an example domain corpus generation process 200, according to an example. The example domain corpus generation process 200 is an example of a process performed by the above described training data generator 108. As is discussed in further detail below, the example domain corpus generation process 200 creates related utterances from a base utterance or a root/model utterance by translating the utterance from its original language, which in an example is a target language for the domain corpus, into corresponding utterances in a number of different intermediate languages, and then translating the utterance in each intermediate language back to the target language. As described below, further processing refines these multiple utterances to automatically produce a diverse domain corpus that covers the desired intents to be classified. The following discussion uses an example where the base utterance and target language for the domain corpus are the same. It is to be understood that the following described systems and methods are also able to be used to create a domain corpus with a target language different than the natural language of the supplied base utterance.

The below described "round trip" translations from the target language to a number of intermediate languages and then back to the target languages has the ability to automatically create a very diverse set of related utterances that convey a similar intent. Machine translation or machine-aided human translation in some examples is used to perform these translations. Such translations have the effect of modifying the original language semantics to fit the language semantics of the language into which the utterance is being translated. Such translation may adjust for nuances in how the different languages handle different linguistic elements. When the utterance in an intermediate language is then translated back to the target language (round-tripping), the semantic differences among the different languages result in translations that differ in content from the original source. These differences reflect the same intent as the original base or root/model utterance but with different natural language syntax. When performing such round trip translations with a number of different intermediate languages, the different syntaxes that are created creates a diverse and extensive set of related utterances that have similar intent. Such a diverse and extensive set of related utterances are well suited to training a machine learning based model to perform natural language classification of utterances that convey that intent. Such a diverse and extensive set of related utterances are also able to accommodate not only the difference in non-native speakers but also for variations in utterances that convey a particular intent. As an example, consider the following US English statement: "What life change events are eligible and qualify for a change to my corporate benefits?" Translating this to Russian and back to US English produces "What changes in life have the right to change in my corporate benefits?".

The example domain corpus generation process 200 receives a base utterance 202, which is similar to the base utterance 104 discussed above, and an intent profile 220, which is similar to the intent profile 106 described above. The base utterance 104 is provided to a target language to intermediate language machine translation bank 204. In an example, the target language to intermediate language machine translation bank 204 operates to translate the base utterance 202 into a number of different intermediate languages using machine translation processing. The illustrated target language to intermediate language machine translation bank 204 includes machine language processing to translate received utterances from the initial, which is also the target, language into "N" intermediate languages. The target language to intermediate language machine translation bank 204 is shown to include a first translator for language 1 242, a second translator for language 2 244, and an $N^{th}$ translator for language "N." In general, the target language to intermediate language machine translation bank 204 is able to include machine translation processing for any number of intermediate languages. In an example, the target language to intermediate language machine translation bank 204 is able to include translation processing to translate a base utterance into at least fifty (50) intermediate languages. In some examples, the target language to intermediate language machine translation bank 204 includes machine language processing to translate utterances from an initial, which is also the target, language into a number of intermediate languages that include languages in, for example, Asian, South American, Bi-Directional (Bi-DI), and Latin language groups.

The translated utterances in each intermediate language that are produced by the translators in the target language to intermediate language machine translation bank 204 are provided to an intermediate language to target language machine translation bank 206. In an example, the intermediate language to target language machine translation bank 206 includes machine translation processing to translate utterances in each of the N intermediate languages produced by the target language to intermediate language machine translation bank 204 back into the target language. The intermediate language to target language machine translation bank 206 performs reverse translations for each utterance produced by the intermediate language to target language machine translation bank 204 from each intermediate language back into the target language and produces a normalized utterance set 208. The normalized utterance set 208 in an example includes N utterances which are produced by the "round trip" translation of the base utterance 202 into each of the N intermediate languages and then translated back to the target language. Performing "round trip" translations with a large number of intermediate languages allows the creation of a very diverse and extensive set of utterances, some of which will be linguistically rich in terms of vocabulary and semantics and syntax.

The intermediate language to target language machine translation bank 206 includes a first reverse translator for language 1 262, a second reverse translator for language 2 264, and an Nth reverse language translator for language N 266. The first reverse translator for language 1 262 receives the translated utterance produced by the first translator for language 1 242 and produces utterance 1 282. The second reverse translator for language 2 264 receives the translated utterance produced by the second translator for language 2 244 and produces utterance 2 284, and an Nth reverse language translator for language N 266 receives the translated utterance produced by the nth translator for language N 242 and produces utterance N 282.

In some examples, a system designer is able to select a categories and number of intermediate languages in order to cause the domain corpus generation to create a sufficiently diverse and extensive set of utterances. In an example, a system designer is able to select intermediate languages with sufficient structural diversity to generate a very diverse set of utterances. Selecting such a combination of intermediate languages is able to produce an extensive and diverse domain corpus that is able to efficiently train a machine learning based model to perform natural language classification.

In some examples, the normalized utterance set 208 includes N utterances where each utterance is produced by the above described round trip translation to and from a different language. In some examples, the normalized utterance set 208 is processed to remove redundant or duplicate utterances.

A cognitive enrichment service 212 in an example processes the normalized utterance set 208 in order to characterize the intent communicated by each utterance in the normalized utterance set. In an example, the cognitive enrichment service 212 utilizes natural language parsing (NLP) and natural language classification (NLC) machine learning models to provide a series of categorical and contextual meta information defining intent parameters for each utterance in the normalized utterance set 208. In an example, the cognitive enrichment service 212 applies natural language understanding to each utterance in the normalized utterance set 208 in order to generate semantic meaning. In the present discussion, semantic meaning is understanding of the sentence/passage contained in a particular utterance in terms of its interpretation to things such as categories, keywords, concepts and entities. For example, the sentence "I put in request to open a firewall port so my computer can contact the internet", would be enriched by the service and perhaps map to the category: /computers/networking/internet. This allows systems of classifications (e.g., taxonomies) to be associated with sentence or passage.

The cognitive enrichment service 212 in an example annotates each utterance in the normalized utterance set 208 with its associated categorical and contextual meta information. Such meta information may take the form of, for example, one or more of keywords, concepts, categories weightings of these indications, or combinations of these. In some examples, such meta information is able to be specified in a hierarchical manner with categories going down the hierarchy from concepts that are broader to concepts that are more defined, such as the above described/computers/networking/internet example. In some examples, the cognitive enrichment service 212 is able to provide a level of confidence for each meta information item. Continuing with the above example, an utterance by be determined by have an intent parameter of "computers" with a confidence of 0.9, an intent parameter of "networking" with a confidence of 0.7, and an intent parameter of "internet" with a confidence of 0.4.

Ranking processing 214 receives the normalized utterance set 208 along with the information produced by the cognitive enrichment service 212. The above described "round trip" translations using a large number of intermediate languages allows the creation, within the normalized utterance set 208, of a root/model utterance 216 that has the following qualities: 1) is a complete sentence; 2) is linguistically rich in terms of vocabulary and semantics/syntax; and 3) is representative of the core intent (or use case) for which classification is to be performed as is specified by the intent profile 220. The ranking processor 214 compares the intent profile 220 and the intent of each utterance in the normalized utterance set 208, as indicated by the annotated information produced and added by the cognitive enrichment service 212 for each utterance, in order to identify a highest ranking matching utterance within the normalized utterance set 208.

In some examples, the ranking processor 214 is able to further determine a highest ranking machine utterance based on confidence levels associated with at least one or more of the intent parameters determined by the cognitive enrichment service 212. For example, confidence levels determined by the cognitive enrichment service 212 for one or more intent parameters is able to be associated with each utterance. The intent profile 220 is also able to specify respective confidence levels for one more intent parameters indicated therein. The meta information produced by the cognitive enrichment service 212 also determines a determined confidence level for at least one respective determined intent parameter within the respective intent parameters for each normalized language utterance. In an example, the cognitive enrichment service 212 determines confidence levels for intent parameters that correspond to the at least one intent parameter in the intent profile 220 for which a confidence level is also specified. In this example, determining the highest ranking utterance is further based on the at least one respective determined confidence level satisfying the respective intent profile confidence level. In an example, the respective intent profile confidence level is satisfied if the determined confidence level is greater that the respective intent profile confidence level.

A target language to M language round trip translation processor 218 receives the root model utterance 216 and performs round trip translations of the root/model utterance 216 using M intermediate languages. These M round trip translations result in M utterances in the target language, with one utterance each being produced for each intermediate language.

The round trip translations performed by the target language to M language round trip translation processor 218 is similar to that described above for the sequential processing of the target language to intermediate language machine translation bank 204 and intermediate language to target language machine translation bank 206. In an example, processing of target language to intermediate language machine translation bank 204 and intermediate language to target language machine translation bank 206 uses a first number of foreign languages as intermediate languages, where the first number is represented by the symbol "N." In an example, the target language to M language round trip translation processor 218 uses a second number of foreign languages as intermediate languages, where the second number is represented by the symbol "M." In various examples, the processing of target language to intermediate language machine translation bank 204 and intermediate language to target language machine translation bank 206 are able to use the same number of intermediate languages, or different numbers of intermediate languages such that N and M in the above description are able to be equal or unequal. In various examples, the particular set of intermediate languages used by the target language to M language round trip translation processor 218 and the combination of the target language to intermediate language machine translation bank 204 and intermediate language to target language machine translation bank 206 are able to include the same intermediate languages, include some but not all of the same intermediate languages, include completely different sets of languages, or have any combination of intermediate languages.

In some examples, the target language to M language round trip translation processor 218 processes the set of M utterances it produces in order to remove redundancies such as duplicate utterances or nearly duplicate utterances. The target language to M language round trip translation processor 218 produces a domain corpus 222 as an output, which in an example consists of a set of M utterances less the removed redundancies.

In an example, the data within the domain corpus 222 is split into training data sets and testing data sets. In an example, this split is performed to cause differing language types to be evenly distributed. In various examples, splitting the domain corpus 222 into training data sets and testing data sets is able to be performed according to any technique. In an example, a training data set is selected from within natural language data contained within the domain corpus.

The machine learning based model used to perform natural language classifications is then trained in an example with the ground truth represented by the root/model utterance 216 and resulting machine translations designated as training data within the domain corpus 222. The machine learning based model used to perform natural language classifications is then tested using the data within the domain corpus 222 that is designated as a testing data set.

Figure 3:
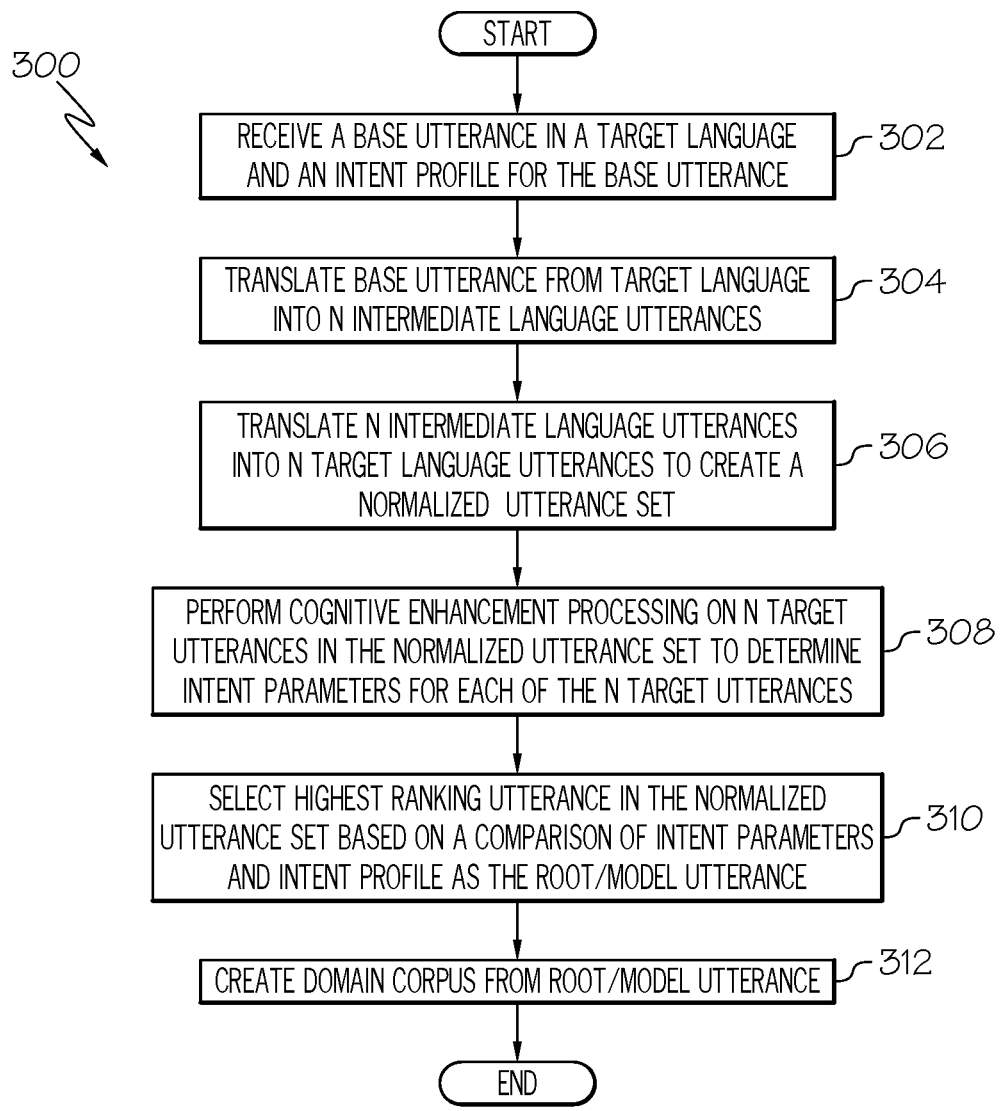
FIG. 3 illustrates a root/model utterance creation processing flow, according to an example.

FIG. 3 illustrates a root/model utterance creation processing flow 300, according to an example. The root/model utterance creation processing flow 300 is an example a portion of the processing flow performed by the example domain corpus generation process 200 described above. The root/model utterance creation processing flow 300 is an example of processing that is able to create a root/model utterance from which a domain corpus is able to be automatically created, such as is the case with the above described root/model utterance 216.

The root/model utterance creation processing flow 300 beings by receiving, at 302, a base utterance in a target language and an intent profile for the base utterance. In an example, the base utterance and intent profile are received via an operator interface 103 discussed above. The received base utterance in an example is received in a target language and is similar to the above described base utterance 104 and base utterance 202 and expresses an intent. The received intent profile are similar to the above described intent profile 106 and intent profile 220 and includes indications of at least one of concepts, sentiment, or emotion associated with the intent.

The base utterance is translated, at 304, from its target language into N intermediate language utterances. In an example this translation is performed by processing similar to that performed by the above described target language to intermediate language machine translation bank 204. In an example, the target language to intermediate language machine translation bank 204 translates, by machine language translation, the base natural language utterance into a plurality of foreign language utterances with each respective foreign language utterance in the plurality of foreign language utterances being translated into a different respective foreign language The N intermediate language utterances are each translated, at 306, back into N target language utterances to create a normalized utterance set. In an example this translation is performed by processing similar to that describe above for the intermediate language to target language machine translation bank 206. In an example, the intermediate language to target language machine translation bank 206 translates, by machine language translation, each respective foreign language utterance in the plurality of foreign language utterances into a respective normalized target language utterance in the target natural language to create a normalized utterance set. The normalized utterance set in an example is similar to the above described normalized utterance set 208.

Cognitive enhancement processing is performed, at 308, on the N target utterances in the normalized utterance set to determine intent parameters for each of the N target utterances. The cognitive enhancement processing in an example is performed by processing similar to that described above for the cognitive enhancement service 212. In an example, the cognitive enrichment service 212 analyzes, by an automated natural language understanding process, each respective normalized target language utterance to determine respective meta information indicating intent parameters for each normalized target language utterance.

A highest ranking utterance is selected, at 310, from the normalized utterance set based on comparisons of intent parameters for each utterance in the normalized utterance set and the received intent profile. This highest ranking utterance is provided as a root/model utterance. The highest ranking utterance in an example is selected by processing similar to that performed by the above described ranking processor 214, which produces a root/model utterance 216. In an example, the ranking processor 214 determines a highest ranking matching utterance from among each respective normalized target language utterance based on comparing each respective meta information for each normalized target language utterance to the intent profile A domain corpus is created, at 312, from the root/model utterance. In various examples, a domain corpus is able to be created from the root/model utterance according to any suitable technique. In an example, the target language to M language round trip translation processor 218 includes a natural language data set creation processor. In an example, a natural language data set creation processor creates a set of natural language data based on further natural language translations of the highest ranking matching utterance. In some examples, the natural language data set creation processor is able to select a testing set of data from within the set of natural language data. The root/model utterance creation processing flow 300 then ends.

Figure 4:
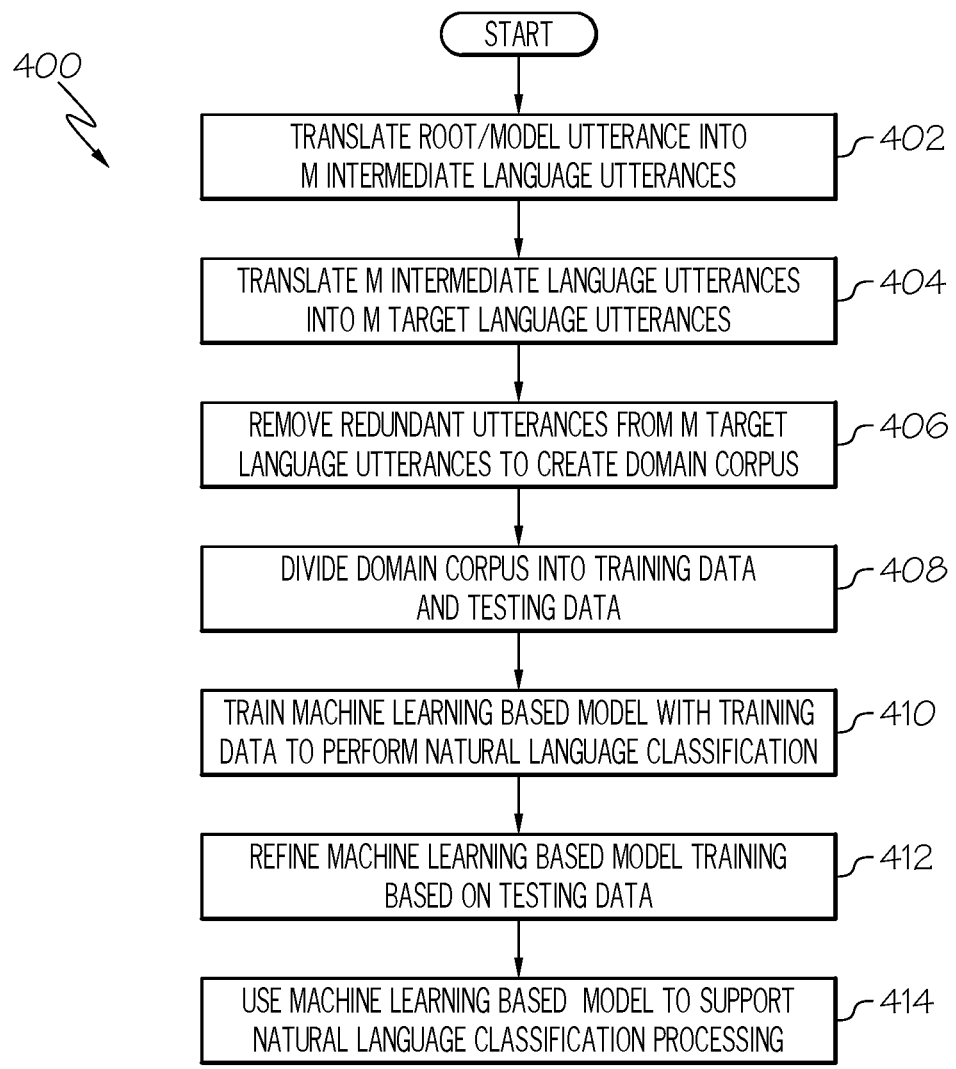
FIG. 4 illustrates an example domain corpus creation and model training processing flow, according to an example.

FIG. 4 illustrates an example domain corpus creation and model training processing flow 400, according to an example. The example domain corpus creation processing flow 400 is an example of part of the processing performed by the above described example domain corpus generation process 200. The root/model utterance creation processing flow 300 receives a root/model utterance, such as the above described root/model utterance 216 that is able to be produced, for example by the above described root/model utterance creation processing flow 300.

The example domain corpus creation and model training processing flow 400 begins by translating, at 402, the root/model utterance into M intermediate language utterances. In an example, this processing is included in the processing of the target language to M language round trip translation processor 218 and uses processing similar to the processing used by the above described target language to intermediate language machine translation bank 204. In an example, this translation includes translating, by machine language translation, the highest ranking matching utterance into a second plurality of foreign language utterances with each respective foreign language utterance in the second plurality of foreign language utterances being translated into a different respective foreign language.

The M intermediate language utterances are then translated, at 404, back in to M target language utterances. In an example, this processing is included in the processing of the target language to M language round trip translation processor 218 and uses processing similar to the processing used by the above described intermediate language to target language machine translation bank 206. In an example, this translation includes translating, by machine language translation, each respective foreign language utterance in the second plurality of foreign language utterances into a respective natural language utterance in the set of natural language data.

In an example, redundant utterances are removed, at 406, from the M target language utterances to create a domain corpus. In various examples, such redundancies, including but not limited to duplicate utterances or utterances that are very similar to teach other, are able to be identified and removed by any suitable processing.

The domain corpus is divided, at 408, into training data and testing data. In various examples, dividing the utterances in the domain corpus into a training set and a testing set is able to be performed by any suitable processing. In an example, the training data set is able to be selected from natural language utterances that are within the created domain corpus.

Machine language learning based models are trained, at 410, with at least part of the set of natural language data, such as with at least part of the natural language utterance data within the domain corpus, to perform natural language classification. In an example, the trained machine language learning based models are similar to the above described machine learning based model 122, which are trained by the above described natural language classifier machine learning based model creator 120. Training of such machine learning based models in an example is based on the training data that is selected out of the domain corpus is able to be performed by any suitable technique.

The training of the machine learning based model is refined, at 412, based on the testing data in the domain corpus. In an example, the training of the machine language learning based models are refined by the above described testing processor 126. Refining the training of such machine learning based models based on the testing data that was selected from the domain corpus is able to be performed by any suitable technique.

The machine learning based model is used, at 414, to support natural language classification processing. In an example, the above natural language classifier 124 uses the machine learning based model 122 to support such natural language classification processing.

Figure 5:
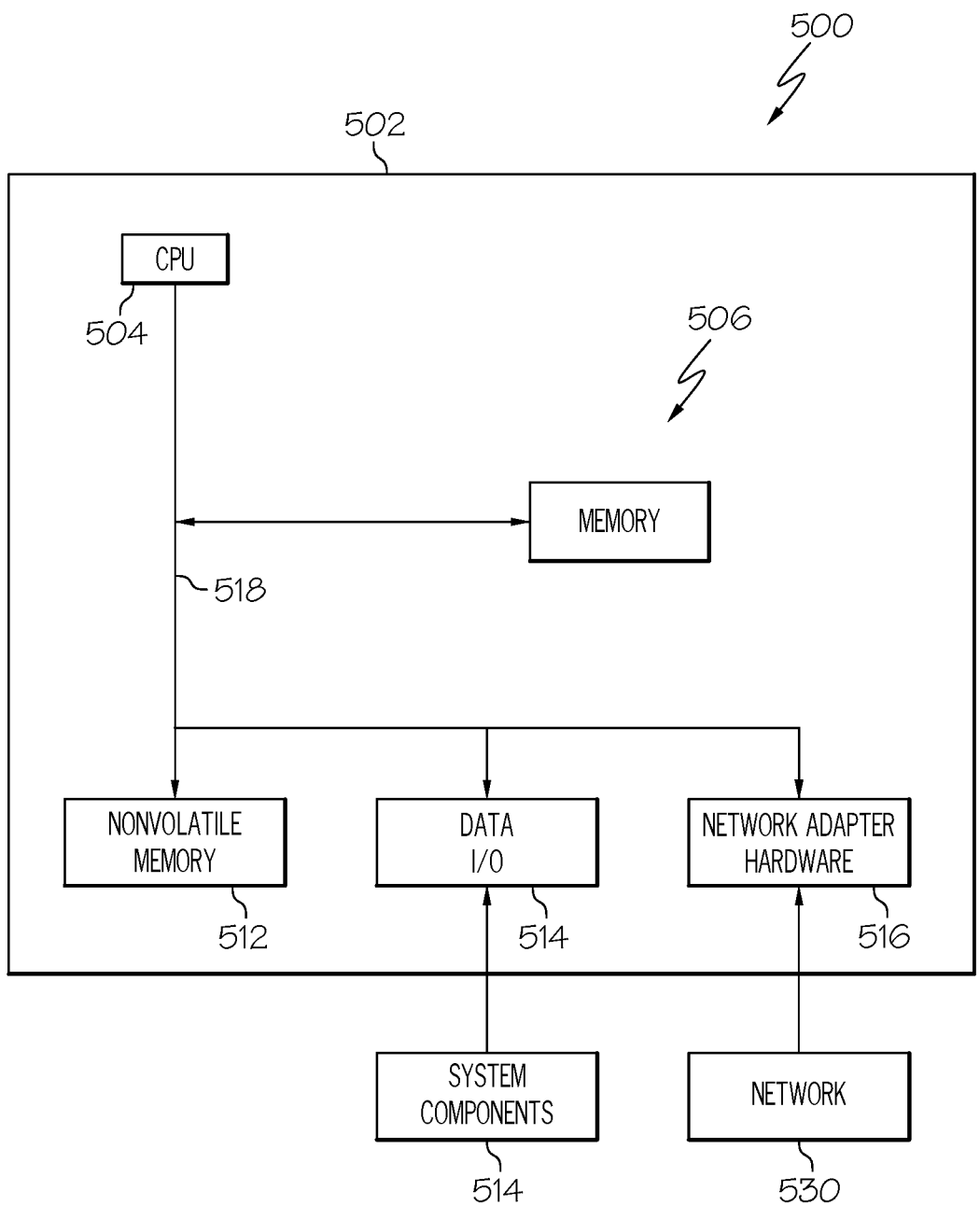
FIG. 5 illustrates a block diagram illustrating a processor, according to an example.

FIG. 5 illustrates a block diagram illustrating a processor 500 according to an example. The processor 500 is an example of a processing subsystem that is able to perform any of the above described processing operations, control operations, other operations, or combinations of these.

The processor 500 in this example includes a CPU 504 that is communicatively connected to a main memory 506 (e.g., volatile memory), a non-volatile memory 512 to support processing operations. The CPU is further communicatively coupled to a network adapter hardware 516 to support input and output communications with external computing systems such as through the illustrated network 530.

The processor 500 further includes a data input/output (I/O) processor 514 that is able to be adapted to communicate with any type of equipment, such as the illustrated system components 528. The data input/output (I/O) processor in various examples is able to be configured to support any type of data communications connections including present day analog and/or digital techniques or via a future communications mechanism. A system bus 518 interconnects these system components.

Information Processing System

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information. In general, the computer readable medium embodies a computer program product as a computer readable storage medium that embodies computer readable program code with instructions to control a machine to perform the above described methods and realize the above described systems.

NON-LIMITING EXAMPLES

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A method for generating a set of natural language data to train a machine learning natural language understanding process, the method comprising:
    receiving a base natural language utterance in a target natural language, the base natural language utterance expressing an intent;
    receiving, in conjunction with receiving the base natural language utterance, an intent profile comprising intent parameters indicating at least one of categories, keywords, concepts, sentiment, entities, or emotion associated with the intent;
    translating, by machine language translation, the base natural language utterance into a plurality of foreign language utterances with each respective foreign language utterance in the plurality of foreign language utterances being translated into a different respective foreign language within a first number of foreign languages;
    translating, by machine language translation, each respective foreign language utterance in the plurality of foreign language utterances into a respective normalized target language utterance in the target natural language to create a normalized utterance set;
    analyzing, by an automated natural language understanding process, each respective normalized target language utterance to determine respective meta information indicating respective intent parameters for each normalized target language utterance;
    determining a highest ranking matching utterance from among each respective normalized target language utterance based on comparing each respective meta information for each normalized target language utterance to the intent profile, wherein the comparing comprises determining the highest ranking matching utterance that has a less than exact match between the each respective meta information and the intent profile;
    creating a set of natural language data in the target natural language comprising a plurality of utterances obtained based on a plurality of further natural language translations of the highest ranking matching utterance, the creating the set of natural language data comprising:
        translating, by machine language translation, the highest ranking matching utterance into a second plurality of foreign language utterances with each respective foreign language utterance in the second plurality of foreign language utterances being translated into a different respective foreign language within a second number of foreign languages where the second number is different than the first number; and
        translating, by machine language translation, each respective foreign language utterance in the second plurality of foreign language utterances into a respective natural language utterance in the set of natural language data;
    crating a training corpus comprising the set of natural language data; and
    training a machine learning natural language understanding process to perform natural language classification in the target natural language with at least part of the set of natural language data.

2. The method of claim 1, further comprising removing redundant utterances from the normalized utterance set.

3. The method of claim 1, further comprising removing redundant utterances from the set of natural language data.

4. The method of claim 1, wherein:
    the intent profile comprises a respective intent profile confidence level for at least one intent parameter in the intent parameters,
    the meta information comprises at least one respective determined confidence level for at least one respective determined intent parameter within the respective intent parameters for each normalized language utterance, where the at least one respective determined intent parameter corresponds to the at least one intent parameter in the intent parameters, and
    the determining the highest ranking utterance is further based on the at least one respective determined confidence level satisfying the respective intent profile confidence level.

5. The method of claim 1, further comprising:
    selecting a testing set of data from within the set of natural language data; and
    refining the machine learning natural language understanding process based on processing the testing set of data with the machine learning natural language understanding process.

6. The method of claim 1, wherein the base natural language utterance and the intent profile are received from an operator via an operator interface.

7. An apparatus for generating a set of natural language data to train a machine learning natural language understanding process, the apparatus comprising:
- a processor;
- a memory communicatively coupled to the processor;
- an operator interface, coupled to the processor and the memory, that when operating:
  - receives a base natural language utterance in a target natural language, the base natural language utterance expressing an intent; and
  - receives, in conjunction with receiving the base natural language utterance, an intent profile comprising intent parameters indicating at least one of categories, keywords, concepts, sentiment, entities, or emotion associated with the intent;
- a target language to intermediate language machine translation bank that, when operating, translates, by machine language translation, the base natural language utterance into a plurality of foreign language utterances with each respective foreign language utterance in the plurality of foreign language utterances being translated into a different respective foreign language, within a first number of foreign languages;
- an intermediate language to target language machine translation bank that, when operating, translates, by machine language translation, each respective foreign language utterance in the plurality of foreign language utterances into a respective normalized target language utterance in the target natural language to create a normalized utterance set;
- a cognitive enrichment service that, when operating, analyzes, by an automated natural language understanding process, each respective normalized target language utterance to determine respective meta information indicating intent parameters for each normalized target language utterance;
- a ranking processor that, when operating, determines a highest ranking matching utterance from among each respective normalized target language utterance based on comparing each respective meta information for each normalized target language utterance to the intent profile, wherein the comparing comprises determining the highest ranking matching utterance that has a less than exact match between the each respective meta information and the intent profile;
- natural language data set creation processor that, when operating:
  - creates a set of natural language data in the target natural language comprising a plurality of utterances based on further natural language translations of the highest ranking matching utterance by at least:
    - translating, by machine language translation, the highest ranking matching utterance into a second plurality of foreign language utterances with each respective foreign language utterance in the second plurality of foreign language utterances being translated into a different respective foreign language within a second number of foreign languages, where the second number is different than the first number; and
    - translating, by machine language translation, each respective foreign language utterance in the second plurality of foreign language utterances into a respective natural language utterance in the set of natural language data;
  - crating a training corpus comprising the set of natural language data; and
- natural language classifier machine learning based model creator that, when operating, trains a machine learning natural language understanding process to perform natural language classification in the target natural language with at least part of the set of natural language data.

8. The apparatus of claim 7, where the intermediate language to target language machine translation block is configured to further, when operating, remove redundant utterances from the normalized utterance set.

9. The apparatus of claim 7, where the natural language data set creation processor is configured to further, when operating, remove redundant utterances from the set of natural language data.

10. The apparatus of claim 7, wherein:
- the intent profile comprises a respective intent profile confidence level for at least one intent parameter in the intent parameters,
- the meta information comprises at least one respective determined confidence level for at least one respective determined intent parameter within the respective intent parameters for each normalized language utterance, where the at least one respective determined intent parameter corresponds to the at least one intent parameter in the intent parameters, and
- the ranking processor is configured to further, when operating, determine the highest ranking utterance further based on the at least one respective determined confidence level satisfying the respective intent profile confidence level.

11. The apparatus of claim 7, wherein the natural language data set creation processor is configured to further, when operating, select a testing set of data from within the set of natural language data, and
where the natural language classifier machine learning based model creator is configured to further, when operating, refine the machine learning natural language understanding process based on processing the testing set of data with the machine learning natural language understanding process.

12. A computer program product for generating a set of natural language data to train a machine learning natural language understanding process, the computer program product comprising:
- a non-transitory computer readable storage medium having computer readable program code embodied therewith, the computer readable program code comprising instructions for:
  - receiving a base natural language utterance in a target natural language, the base natural language utterance expressing an intent;
  - receiving, in conjunction with receiving the base natural language utterance, an intent profile comprising intent parameters indicating at least one of categories, keywords, concepts, sentiment, entities, or emotion associated with the intent;
  - translating, by machine language translation, the base natural language utterance into a plurality of foreign language utterances with each respective foreign language utterance in the plurality of foreign language utterances being translated into a different respective foreign language within a first number of foreign languages;
  - translating, by machine language translation, each respective foreign language utterance in the plurality of foreign language utterances into a respective normalized target language utterance in the target natural language to create a normalized utterance set;

analyzing, by an automated natural language understanding process, each respective normalized target language utterance to determine respective meta information indicating intent parameters for each normalized target language utterance;

determining a highest ranking matching utterance from among each respective normalized target language utterance based on comparing each respective meta information for each normalized target language utterance to the intent profile, wherein the comparing comprises determining the highest ranking matching utterance that has a less than exact match between the each respective meta information and the intent profile;

creating a set of natural language data in the target natural language comprising a plurality of utterances obtained based on a plurality of further natural language translations of the highest ranking matching utterance, the creating the set of natural language data comprising:
  translating, by machine language translation, the highest ranking matching utterance into a second plurality of foreign language utterances with each respective foreign language utterance in the second plurality of foreign language utterances being translated into a different respective foreign language within a second number of foreign languages, where the second number is different than the first number; and
  translating, by machine language translation, each respective foreign language utterance in the second plurality of foreign language utterances into a respective natural language utterance in the set of natural language data;

crating a training corpus comprising the set of natural language data; and training a machine learning natural language understanding process to perform natural language classification in the target natural language with at least part of the set of natural language data.

13. The computer program product of claim 12, wherein:
the intent profile comprises a respective intent profile confidence level for at least one intent parameter in the intent parameters,
the meta information comprises at least one respective determined confidence level for at least one respective determined intent parameter within the respective intent parameters for each normalized language utterance, where the at least one respective determined intent parameter corresponds to the at least one intent parameter in the intent parameters, and
the computer readable program code further comprising instructions for determining the highest ranking utterance is further based on the at least one respective determined confidence level satisfying the respective intent profile confidence level.

14. The computer program product of claim 12, the computer readable program code further comprising instructions for:
selecting a testing set of data from within the set of natural language data; and
refining the machine learning natural language understanding process based on processing the testing set of data with the machine learning natural language understanding process.

* * * * *

UNITED STATES PATENT AND TRADEMARK OFFICE
CERTIFICATE OF CORRECTION

PATENT NO. : 11,664,010 B2
APPLICATION NO. : 17/088071
DATED : May 30, 2023
INVENTOR(S) : Brien Muschett et al.

Page 1 of 1

It is certified that error appears in the above-identified patent and that said Letters Patent is hereby corrected as shown below:

In the Claims

In Column 14, Line 33 Claim 1 change "crating" to "creating"

In Column 15 Line 66 Claim 7 change "crating" to "creating"

In Column 18 Line 1 Claim 12 change "crating" to "creating"

Signed and Sealed this
Thirteenth Day of February, 2024

Katherine Kelly Vidal
*Director of the United States Patent and Trademark Office*